(12) United States Patent
Watanabe et al.

(10) Patent No.: US 10,484,613 B2
(45) Date of Patent: Nov. 19, 2019

(54) IMAGE CAPTURING CONTROL APPARATUS CAPABLE TO PERFORM NOTIFICATION FOR CHANGE OF CAPTURING RANGE ASSOCIATED WITH INDICATING INCLUSION OF MIKIRE, METHOD OF CONTROLLING, AND STORAGE MEDIUM

(71) Applicant: CANON KABUSHIKI KAISHA, Tokyo (JP)

(72) Inventors: Kazuhiro Watanabe, Tokyo (JP); Soushi Takita, Kawasaki (JP); Wataru Kaku, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/883,768

(22) Filed: Jan. 30, 2018

(65) Prior Publication Data

US 2018/0220078 A1 Aug. 2, 2018

(30) Foreign Application Priority Data

Feb. 1, 2017 (JP) ................................. 2017-016973

(51) Int. Cl.
*H04N 5/222* (2006.01)
*H04N 5/232* (2006.01)

(52) U.S. Cl.
CPC ..... *H04N 5/23293* (2013.01); *H04N 5/23216* (2013.01); *H04N 5/23296* (2013.01)

(58) Field of Classification Search
CPC ......... H04N 5/23293; H04N 5/232945; H04N 5/232941; H04N 5/23216; H04N 5/23296

USPC ....................................................... 348/333.11
See application file for complete search history.

(56) References Cited

U.S. PATENT DOCUMENTS

| | | | |
|---|---|---|---|
| 2004/0189829 A1* | 9/2004 | Fukuda | H04N 5/232 348/239 |
| 2011/0317031 A1* | 12/2011 | Honda | H04N 5/23219 348/229.1 |
| 2013/0038759 A1* | 2/2013 | Jo | H04N 5/2256 348/240.99 |

(Continued)

FOREIGN PATENT DOCUMENTS

| | | |
|---|---|---|
| JP | 04-269081 A | 9/1992 |
| JP | 2009-153077 A | 7/2009 |

(Continued)

*Primary Examiner* — Usman A Khan
(74) *Attorney, Agent, or Firm* — Cowan, Liebowitz & Latman, P.C.

(57) ABSTRACT

An image capturing control apparatus, comprises: at least one processor or circuit configured to perform the operations of following units: a display control unit configured to perform control to display a video that an image capturing unit is capturing on a display unit; a boundary setting unit configured to set a boundary in relation to the video that is displayed on the display unit; a detection unit configured to detect a change of a capturing range in the image capturing unit; and a notification unit configured to, in a state in which the capturing range displayed does not include the outer side of the boundary, and in a case where the boundary is close to the capturing range from the inner side of the boundary, perform a notification by a display.

17 Claims, 9 Drawing Sheets

(56) References Cited

U.S. PATENT DOCUMENTS

| | | | |
|---|---|---|---|
| 2013/0242136 A1* | 9/2013 | Chen | H04N 5/23219 348/231.99 |
| 2013/0258117 A1* | 10/2013 | Penov | G06K 9/6202 348/207.1 |
| 2017/0134647 A1* | 5/2017 | Tobin | H04N 5/23222 |

FOREIGN PATENT DOCUMENTS

| | | |
|---|---|---|
| JP | 2010-088076 A | 4/2010 |
| JP | 2010-147712 A | 7/2010 |

* cited by examiner

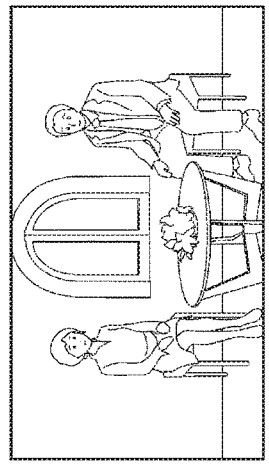
FIG. 5A1
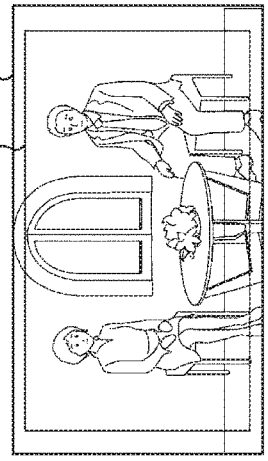
FIG. 5B1
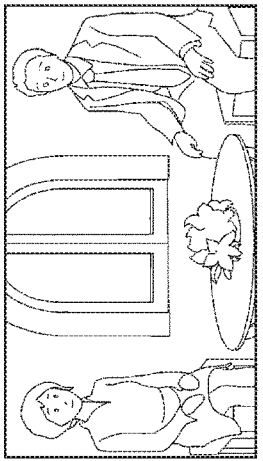
FIG. 5C1
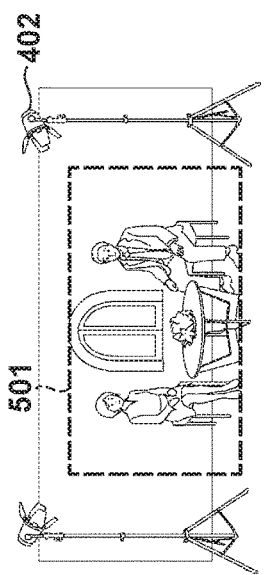
FIG. 5A2
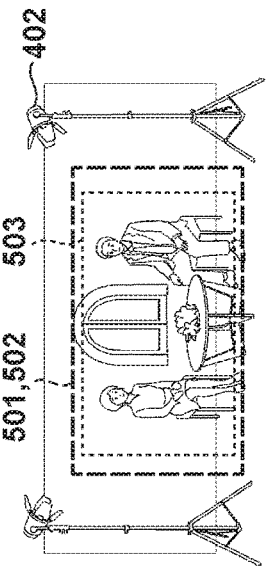
FIG. 5B2
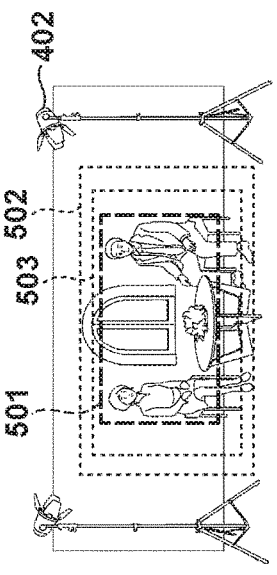
FIG. 5C2

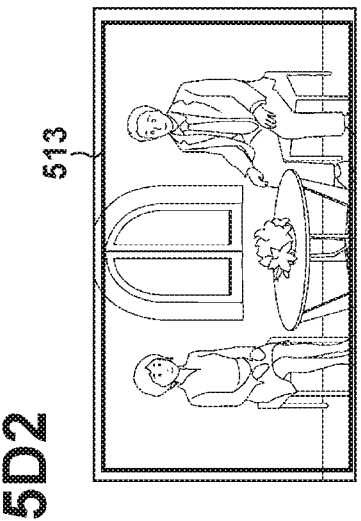
FIG. 5D2
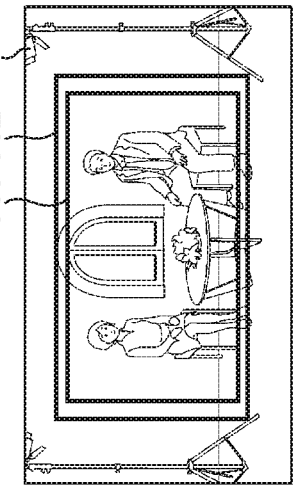
FIG. 5E2
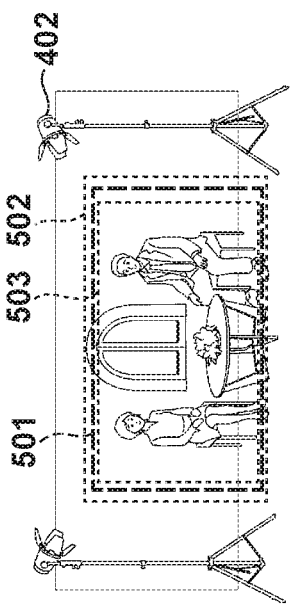
FIG. 5D1
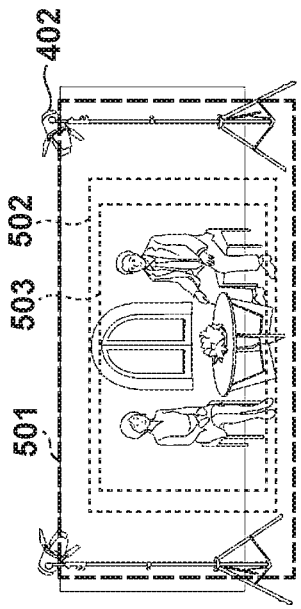
FIG. 5E1

IMAGE CAPTURING CONTROL APPARATUS CAPABLE TO PERFORM NOTIFICATION FOR CHANGE OF CAPTURING RANGE ASSOCIATED WITH INDICATING INCLUSION OF MIKIRE, METHOD OF CONTROLLING, AND STORAGE MEDIUM

BACKGROUND OF THE INVENTION

Field of the Invention

The present invention is related to an image capturing control apparatus capable to perform a notification for a change of capturing range, a method of controlling, and a storage medium.

Description of the Related Art

When capturing video such as a movie or a drama, a studio set is set up, and image capturing instruments such as light stands and audio stands are installed. Such image capturing instruments or things other than the studio set (thing that should not actually appear in the captured images) appearing in the video is commonly referred to as "mikire", which is one type of video capturing failure. "Mikire" mainly occurs when the operator of an image apparatus (a so-called camera operator) performs an operation such as a zoom, pan, or tilt to change the angle of view.

There are known techniques that facilitate understanding of how a captured image will change upon an operation since the content of the captured image will greatly change when the angle of view is changed upon an operation such as a zoom or a pan. Japanese Patent Laid-Open No. 2010-88076 discloses a technique in which, when changing the angle of view, a predicted angle of view is calculated from a zoom lens position and velocity, and an assistance frame that indicates the predicted angle of view is displayed on a display unit. Also, Japanese Patent Laid-Open No. 2009-153077 discloses a technique in which motion of a camera is detected, and a graphic element is displayed so as to be fixed with respect to surrounding scenery.

Meanwhile, there is a known technique for complementing a mikire portion with an electronic set image to relax a restriction on a camera shot in order to solve the problem that the camera shot is restricted by the fact that there is a mikire portions such as illumination units in the studio set. Japanese Patent Laid-Open No. H4-269081 discloses a technique in which studio set design data is inputted, a camera position, rotation angle, and lens magnification information are obtained, and an electronic set image is generated in a mikire portion where the studio set is not present.

However, in these conventional techniques, there is a problem in that when an operator of the image apparatus (camera operator) has performed an operation such as zooming or panning, the operator cannot know in advance that, if the operator zooms out any more, an image capturing instrument will be captured and "mikire" will occur.

SUMMARY OF THE INVENTION

The present invention has been made in consideration of the aforementioned problems, and realizes a technique by which the operator (camera operator) can receive a notification in advance in cases where so-called "mikire" will occur when the operator has changed the angle of view.

In order to solve the aforementioned problems, one aspect of the present invention provides an image capturing control apparatus, comprising: at least one processor or circuit configured to perform the operations of following units: a display control unit configured to perform control to display a video that an image capturing unit is capturing on a display unit; a boundary setting unit configured to set a boundary in relation to the video that is displayed on the display unit; a detection unit configured to detect a change of a capturing range in the image capturing unit; and a notification unit configured to, in a state in which the capturing range displayed on the display unit does not include the outer side of the boundary set by the boundary setting unit, and in a case where the boundary is close to the capturing range from the inner side of the boundary, perform a notification by a display that differs to a case where the boundary is not close.

Another aspect of the present invention provides, a method of controlling an image capturing control apparatus, the method comprising: performing a display control to display, on a display, a video that an image capturing unit is capturing; setting a boundary in relation to the video that is displayed on the display; detecting a change of a capturing range in the image capturing unit; and in a state in which the capturing range displayed on the display does not include the outer side of the boundary, and in a case where the boundary is close to the capturing range from the inner side of the boundary, performing a notification by displaying differently to a case where the boundary is not close.

Still another aspect of the present invention provides, a non-transitory computer-readable storage medium storing a program for causing a computer to execute a method of controlling an image capturing control apparatus, the method comprising: performing a display control to display, on a display, a video that an image capturing unit is capturing; setting a boundary in relation to the video that is displayed on the display; detecting a change of a capturing range in the image capturing unit; and in a state in which the capturing range displayed on the display does not include the outer side of the boundary, and in a case where the boundary is close to the capturing range from the inner side of the boundary, performing a notification by displaying differently to a case where the boundary is not close.

According to the present invention, it becomes possible to provide an image capturing control apparatus in which the operator (camera operator) can receive a notification in advance in cases where so-called "mikire" is likely to occur when the operator has changed the angle of view.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A1-5E2 are screen transition views which represent changes in a display state of a display unit 108 due to a zoom operation by an operator.

DESCRIPTION OF THE EMBODIMENTS

Below, explanation will be given of illustrative embodiments with reference to the accompanying drawing.

In the present embodiment, an operator (camera operator) can confirm so-called "mikire", such as a portion outside of a studio set or an image capturing instrument, on a display unit of the digital camera 100, and set "a boundary" which is an indication as to where "mikire" will occur. Also, in a case where the operator (camera operator) performs an operation such as zoom, pan, or tilt and the display area of the display unit becomes close to this "boundary", the digital camera 100 superimposes a graphic such as a rectangle or a line on the captured video and displays the result. A configuration example for notifying the operator (camera operator) in this way that the "boundary" is getting close to the display area will be described below.

(Configuration of the Digital Camera 100)

Figure 1:
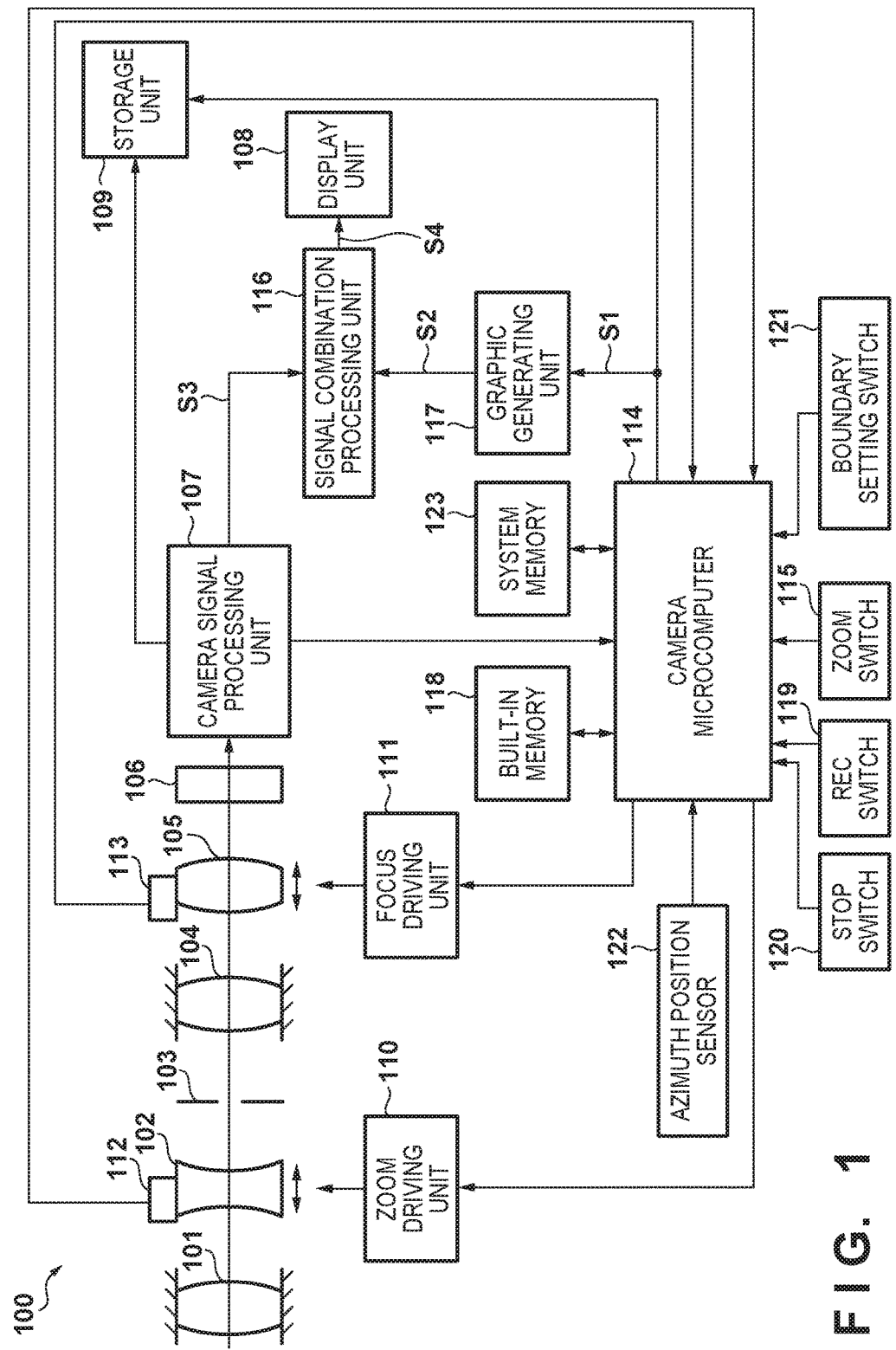
FIG. 1 is a block diagram which illustrates a configuration example of a digital camera 100 as an example of an image capturing control apparatus according to the present invention.

With reference to FIG. 1, an example of a functional configuration of the digital camera 100 will be described as one example of an image capturing control apparatus according to the present embodiment. A first fixed lens group 101 is a fixed lens group (imaging optical system), and a zoom lens 102 is a lens that is arranged to be able to move forward/backward in a direction of the optical axis of the lens group and that is for performing magnification. An aperture 103 is a mechanism for adjusting an amount of light incident on an image sensing element. A second fixed lens group 104 is a lens group that is fixed similarly to the first fixed lens group 101. A focus lens 105 is a lens whose focus position can be adjusted, and that has both a focus adjustment function and a so-called compensation function that corrects movement of the focal plane due to zooming.

An image sensor 106 has a configuration in which a plurality of pixels having a photoelectric conversion element are arranged two-dimensionally. The image sensor 106, in each pixel, photoelectrically converts an optical image of a subject formed via the first fixed lens group 101, and further performs an analog/digital conversion by an A/D conversion circuit, and outputs a digital signal (image signal) of the pixel units. The image sensor 106 may be a CCD (Charge-Coupled Device) image sensor or a CMOS (Complementary Metal Oxide Semiconductor) image sensor.

A camera signal processing unit 107 performs processing to convert the image (video) signals from the image sensor 106 into signals for the display unit 108 and a storage unit 109. The storage unit 109 records a captured image signal in a recording medium in accordance with a later-described REC switch being operated. For the recording medium, typically a semiconductor memory, a magneto-optical disc, a magnetic tape, or the like is used. A zoom driving unit 110 is a drive apparatus for driving the zoom lens 102, and a focus driving unit 111 is a drive apparatus for driving the focus lens 105. The zoom driving unit 110 and the focus driving unit 111 are equipped with a monitor and a driver unit (not shown).

A camera microcomputer 114 includes a processor such as a CPU or an MPU, and a program stored in a built-in memory 118 is loaded in a system memory 123 and executed, and thereby each block of the digital camera 100 is controlled and data transfer between the respective blocks is controlled. The camera microcomputer 114 performs control of the zoom driving unit 110 and the focus driving unit 111, control in accordance with a later-described zoom switch 115 which is an operation member of the zoom lens 102, and control of an output signal of the camera signal processing unit 107. Also, the camera microcomputer 114 calculates the target position of the zoom lens 102 and the focus lens 105 from an optimized operation state, and compares it with a position detected by a later-described lens position detection unit. Then, each lens position is adjusted by controlling the zoom driving unit 110 and the focus driving unit 111. The system memory 123 is a volatile memory such as a semiconductor memory, for example, and is used as a work area when the camera microcomputer 114 performs calculations.

A lens position detection unit 112 is a sensor for detecting the position of the zoom lens 102 and a lens position detection unit 113 is a sensor for detecting the position of the focus lens 105. Lens position detection units 112, 113 are equipped with a photosensor and a light shielding plate (not shown), for example. The photosensor is configured by a light-emitting unit and a light-receiving unit and is fixed on a lens barrel and light shielding plates are fixed on the zoom lens 102 and the focus lens 105. When the zoom lens 102 and the focus lens 105 move in a direction parallel to the optical axis, the light shielding plates move with them as a single body. When the light path between the light-emitting unit and the light-receiving unit of the photosensor is obstructed, the output signal of the light-receiving unit is a low level and when it is unobstructed, the output signal is a high level. Accordingly, it is possible to detect whether or not the zoom lens 102 and the focus lens 105 are at a basis position, assuming that the basis position is the position at which the output signal of the light-receiving unit changes. The camera microcomputer 114 can recognize the position of each lens based on the basis position of the zoom lens 102 and the focus lens 105, a lens moving velocity, a lens movement direction, and the like.

The zoom switch 115 is an operation member for causing the zoom lens 102 to move in a wide-angle (hereinafter described as "wide") direction and a telephoto (hereinafter described as "tele") direction, and is connected to the camera microcomputer 114. The zoom switch 115 is a configuration that changes a voltage in accordance with the amount of pressure thereon. The camera microcomputer 114 detects the change in voltage when the zoom switch 115 is operated, and decides the zooming speed at which to drive the zoom lens 102 in a variable speed zoom in accordance with the voltage.

The built-in memory 118 is a memory in which programs for the camera microcomputer 114 to operate and various settings such as a display language are recorded.

A REC switch 119 is an operation member for instructing the operator (camera operator) to start recording of a captured video signal to the storage unit 109, and is a switch or a button, for example. Also, a STOP switch 120 is an operation member for instructing the stoppage of recording, and is configured by a switch or a button, for example. There are cases in which a single operation button combines the functions of the REC switch 119 and the STOP switch 120.

A boundary setting switch 121 is an operation member by which the operator (camera operator) can cause an angle of view that is an indication that "mikire" will occur to be stored, and is configured by a switch or a button, for example. An azimuth position sensor 122 functions as an imaging direction sensor for detecting, by acceleration measurement, geomagnetism measurement, or gyro measurement, for example, a direction (camera direction) in relation to a basis direction and a change (horizontally and in a height) in relation to a basis position. The camera microcomputer 114 can read table data that holds a relation between a zoom position and a focal length (or a zoom ratio) stored in the built-in memory 118. The camera microcomputer 114 calculates the position and size of a "mikire frame" and a "mikire prevention frame", which are described later, from the detected camera direction and zoom position with reference to a data table when executing a program. Additionally, a position and size signal S1 for a graphic which is the result of calculation is supplied to a graphic generating unit 117. This calculation is described later.

The graphic generating unit 117 is a calculation circuit or module, and the graphic generating unit 117 generates a mikire prevention graphic signal S2 based on a mikire prevention graphic position and size signal S1 and supplies the signal S2 to a later-described signal combination processing unit 116. The signal combination processing unit 116 combines the mikire prevention graphic signal S2 outputted from the graphic generating unit 117 with a video signal S3 from the camera signal processing unit 107 and outputs a combined video signal S4.

The display unit 108 may be a display device such as a liquid crystal display, an organic electroluminescence display, or electronic paper, for example, and the display unit 108 configures a later-described monitor and viewfinder. The display unit 108 can display the "mikire frame" and the "mikire prevention frame" superimposed onto the captured video by displaying the combined video signal S4, for example.

The "mikire frame" and the "mikire prevention frame" are graphics that are superimposed on the captured video in the display unit in order to visually notify the operator (camera operator) that the boundary across which mikire will occur is close, and the "mikire frame" and the "mikire prevention frame" are line segment graphics whose width is fixed, for example.

(Example of Outer Appearance of Digital Camera 100)

Figure 2:
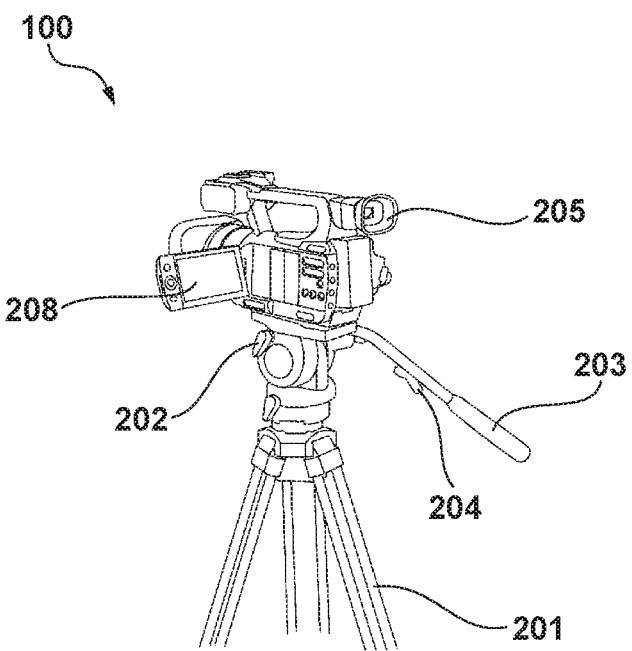
FIG. 2 is an external perspective view of the digital camera 100 according to the present embodiment.

FIG. 2 is an external perspective view of the digital camera 100 according to this embodiment. Reference numeral 201 denotes a tripod, reference numeral 202 denotes a panhead, reference numeral 203 denotes a pan rod, and reference numeral 204 denotes a remote switch.

The operator (camera operator) changes the camera direction of the digital camera by operating the pan rod 203 to change the angle of the panhead 202. Also, by operating the zoom switch 115, or the remote switch 204 which has equivalent operation thereto, the zoom position of the digital camera is changed.

The video that is being captured and various graphics such as a REC display are displayed on the viewfinder 205 and the monitor 208 included in the display unit 108.

(Sequence of Operations According to Display Processing)

Figure 3A:
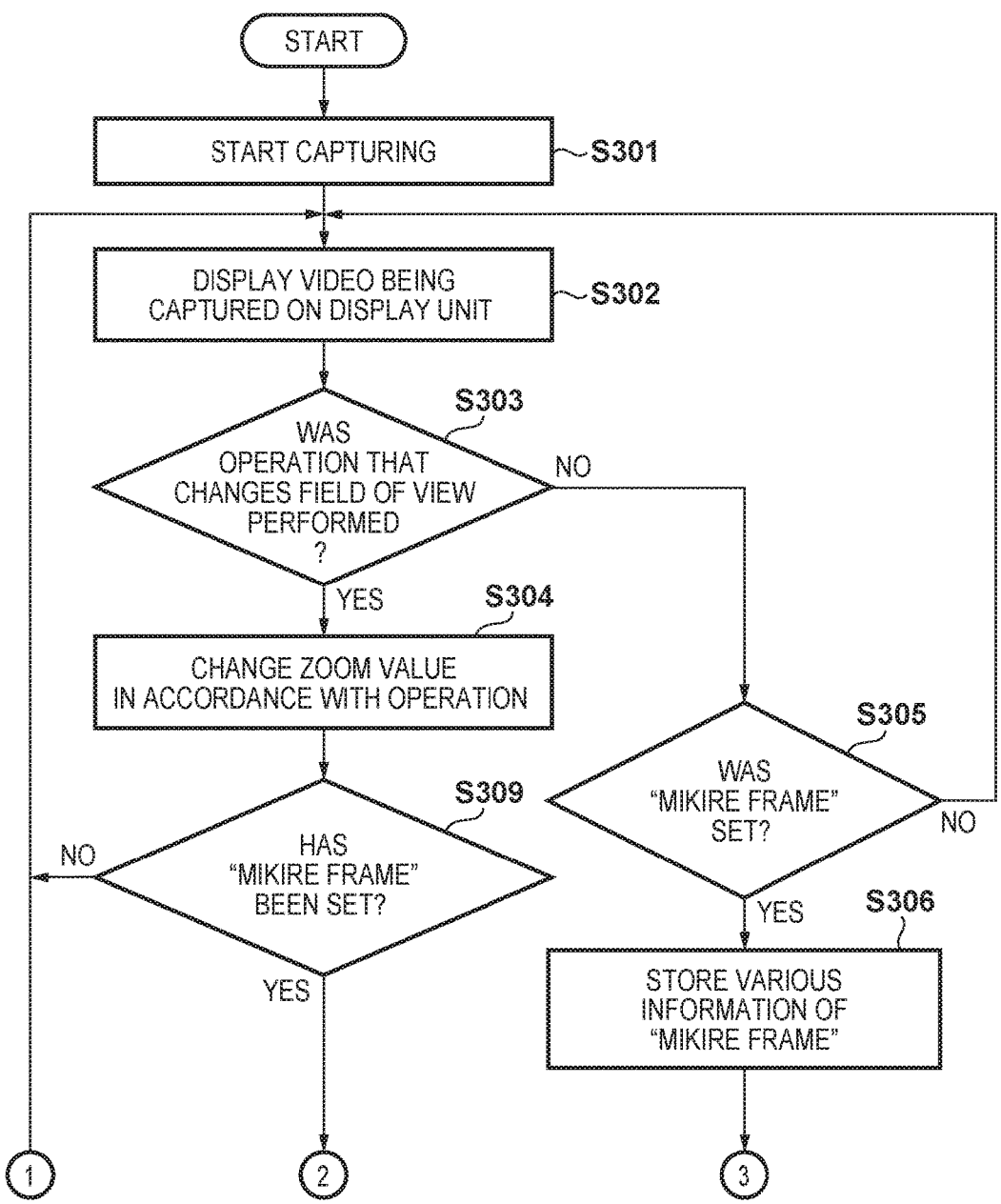
FIGS. 3A-3B are flowcharts which describe flows of determinations/processing by the digital camera 100 according to the present embodiment.
Figure 3B:
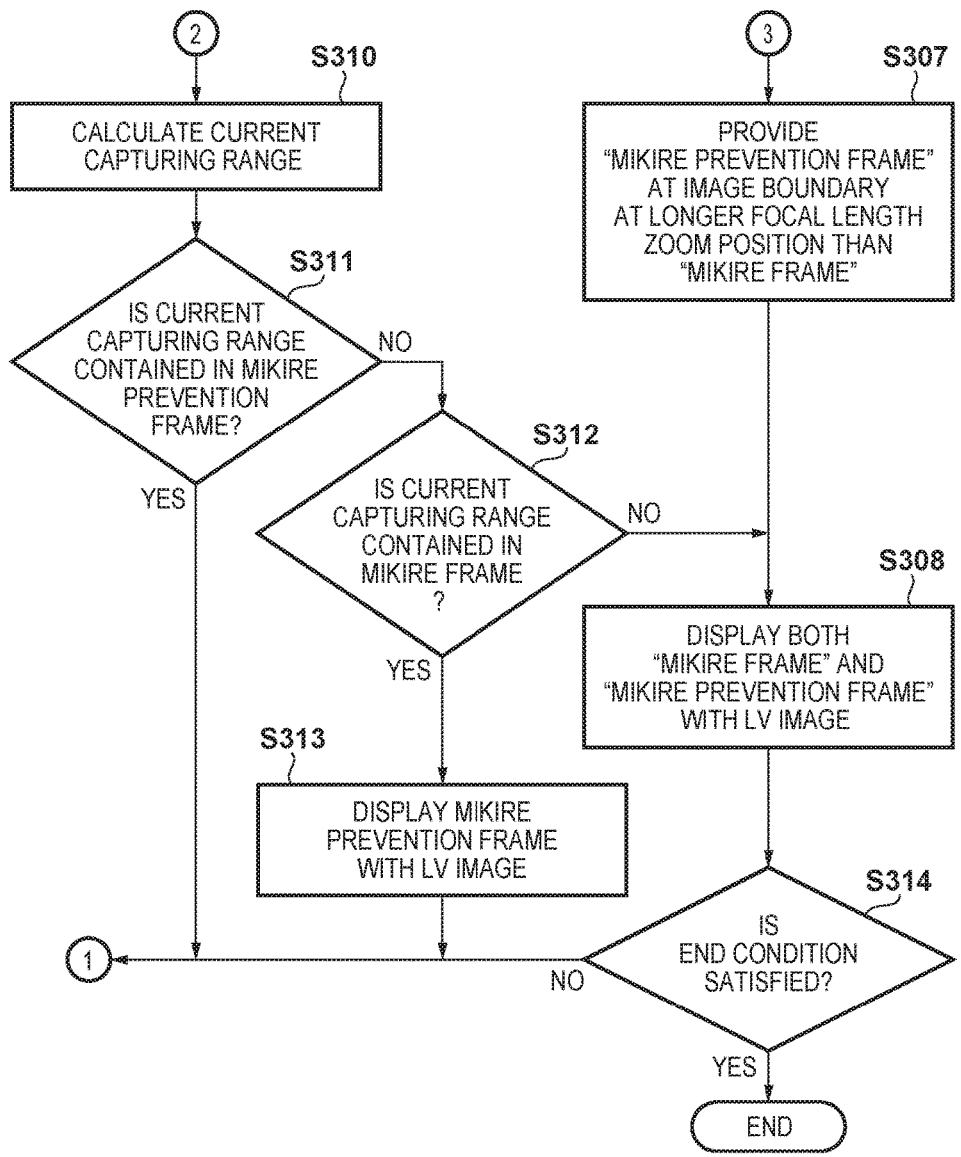

Next, with reference to FIGS. 3A-3B, a sequence of operations according to display processing in the digital camera 100 will be described. Note that these determinations/processes are realized by the camera microcomputer 114 loading a program recorded in the built-in memory 118 into the system memory 123 and executing the program. Also, this processing is started when the power supply of the digital camera 100 is inputted by the operator.

In step S301, the camera microcomputer 114 starts capturing. For example, the camera microcomputer 114 causes the image sensor 106 to sequentially output image signals.

In step S302, the camera microcomputer 114 displays (LV display) on the display unit 108 the video (live view image, LV image) for which the image signals that are sequentially outputted from the image sensor 106 are captured.

In step S303, the camera microcomputer 114 determines whether or not there was an operation that changes the angle of view (capturing range) such as a zoom or pan/tilt by the operator. The camera microcomputer 114 determines whether there was an operation that changes the capturing range in a case where it is detected that the zoom switch 115 was operated. Also, if it is detected by an azimuth position sensor that there was a change in the capturing direction, it is determined that there was an operation that changes the capturing range. If movement of the camera position is detected by the azimuth position sensor 122, it is determined that there was an operation that changes the capturing range. The camera microcomputer 114 advances to step S304 if the detection result is that there was an operation that changes the capturing range, and advances to step S305 otherwise.

In step S305, the camera microcomputer 114 determines whether or not the boundary setting switch 121 was pressed. If the boundary setting switch 121 was pressed (in other words, a boundary that is an indication of "mikire" was set by the operator), step S306 is advanced to, and otherwise step S302 is returned to.

In step S306, the camera microcomputer 114 causes various information that configures the boundary which indicates "mikire" to be stored in the built-in memory 118. For example, the operator confirms on the display unit 108 an angle of view at which "mikire" does not occur by a field of view change operation such as a zoom or pan/tilt, and then operates the boundary setting switch 121. Then, the camera microcomputer 114 causes a zoom position z0 and a camera direction r0 in relation to a basis direction to be stored. The camera direction r0 is a direction in which the incident surface of the lens group faces (capturing direction, direction that the image sensor 106 faces when not a folded optics system), and includes the following values which are detected at that point in time by the azimuth position sensor.

- a yaw angle: a rotation angle of the digital camera 100 about the optical axis (Z-axis, front and back direction) which is an incidence direction in which light is incident on the incident surface of the lens group. In other words, it is an inclination with respect to left and right directions corresponding to the horizontal of the captured image.
- a pitch angle: a rotation angle of the digital camera 100 about a vertical direction axis (Y-axis) of the digital camera 100. In other words, it is a direction facing the incident surface of the lens group among directions orthogonal to the gravitational direction. In other words, it is the azimuth direction.
- a roll angle: a rotation angle about a left-right axis (X-axis) of the digital camera 100. In other words, this is an elevation angle, an angle of dip, or a depression).

Also, the camera microcomputer 114 detects a change (horizontal and height) by the azimuth position sensor 122 if there is a movement of the camera position, and stores it in the built-in memory 118. A position detection system such as GPS (Global Positioning System) may also be used.

In step S307, the camera microcomputer 114 provides a "mikire prevention frame" at the angle of view boundary of a zoom position z2 whose focal length is longer that of the zoom position z0 of the "mikire frame" in the same camera direction r0 as that of the "mikire frame". In other words, z2, whose focal length is longer than that of z0 by a predetermined amount, is calculated and stored in the built-in memory 118.

In step S308, the camera microcomputer 114 controls to generate "mikire frame" and "mikire prevention frame" graphics data by the graphic generating unit 117, combines them with the LV image by the signal combination processing unit 116, and displays the combination on the display unit 108. Immediately after it is determined in step S305 that the mikire frame was set, a range 502 corresponding to the mikire frame and a current capturing range 501 are the same as in the state illustrated in FIG. 5B1. Accordingly, a mikire frame 512 is displayed along the edge of the LV image as illustrated in FIG. 5B2, and a mikire prevention frame 513 is displayed inside of that (detailed description is given later in FIGS. 5A1-5E2). When the mikire frame and the mikire prevention frame are displayed, step S314 is advanced to.

Meanwhile, in a case where a field of view change operation is determined to have been performed in step S303, processing from step S304 is executed. In step S304, the camera microcomputer 114 performs a change of the capturing range such as a change in a zoom value in accordance with an operation by the operator.

In step S309, the camera microcomputer 114 determines whether or not a mikire frame has been set by the processing of step S305 to step S307. For example, if the boundary setting switch 121 operation is not being performed, or the various information that configures the "mikire" boundary is not stored in the built-in memory 118, it is determined that the mikire frame has not been set, step S302 is returned to, and the processing is repeated. In such a case, even if the capturing range is changed, the mikire frame 512 and the mikire prevention frame 513 are not displayed. If the mikire frame is already set, step S310 is advanced to.

In step S310, the camera microcomputer 114 calculates/obtains the current capturing range. In other words, the camera direction r1 and the zoom position z1 for the capturing range after the change (the current capturing range) are obtained. The camera direction r1 is obtained from the azimuth position sensor 122. If there is a movement of the camera position, camera position information (camera movement information) is further obtained. Below, the current capturing range is assumed to be based on the camera direction r1 and the zoom position z1, and further based on camera position information (camera movement information) in the case where there is a camera position movement.

In step S311, the camera microcomputer 114 compares the camera direction r1 and the zoom position z1 that indicate the current capturing range and the camera direction r0 and the zoom position z2 that indicate the mikire prevention frame, and determines whether or not the current capturing range is contained within the range corresponding to the mikire prevention frame. If it is determined to be contained within the mikire prevention frame, there still a margin until the mikire frame and there is a low possibility of mikire, and therefore the mikire prevention frame 513 and the mikire frame 512 are not displayed. Such a determination corresponds to a state illustrated in FIG. 5C1, and the current capturing range 501 is a range that is contained within a range 503 corresponding to the mikire prevention frame. Accordingly, the camera microcomputer 114, as illustrated in FIG. 5C2, does not display the mikire prevention frame 513 and the mikire frame 512 on the live view. In other words, if the current capturing range is determined in step S311 to be contained within the range corresponding to the mikire prevention frame, step S302 is returned to without performing the processing to display the mikire prevention frame 513 and the mikire frame 512, and the processing is repeated.

In step S312, the camera microcomputer 114 compares the camera direction r1 and the zoom position z1 that indicate the current capturing range and the camera direction r0 and the zoom position z0 that indicate the mikire frame, and determines whether or not the current capturing range is contained within the range corresponding to the mikire frame. If it determines that the current capturing range is contained within the range corresponding to the mikire frame, step S313 is advanced to, and if it is determined that it is not contained within the range corresponding to the mikire frame, step S308 is advanced to.

In step S313, the camera microcomputer 114 superimposes the mikire prevention frame 513 which is the range corresponding to the camera direction r0 and the zoom position z2 onto the LV image, and displays the result on the display unit 108 (the mikire frame 512 is not displayed). Step S313 is performed in a case where it is determined in step S311 that the current capturing range is not contained within the mikire prevention frame, and it is determined in step S312 that the current capturing range is contained within the mikire frame. In other words, if mikire is not occurring but the mikire frame will be reached soon, there will be a high possibility of mikire if the capturing range is changed any more. Accordingly, by displaying the mikire prevention frame 513, the camera operator is alerted with a warning. This situation is as illustrated in FIG. 5D1, for example, and at least a portion of the current capturing range 501 is in a range on the outside of the range 503 corresponding to the mikire prevention frame, and is a range that does not protrude out of the range 502 which corresponds to the mikire frame. In such a case, the camera microcomputer 114 displays the mikire prevention frame 513 on the LV image as illustrated in FIG. 5D2. The operator, by seeing the display of the mikire prevention frame 513, can recognize that there is a high possibility that mikire will occur if he or she widens the capturing range by zooming out any more or changes the capturing range by panning/tilting. Accordingly, the camera operator can perform image capturing while taking care to not zoom out, pan, or tilt any more, and can prevent mikire from happening.

In the case where it is determined in step S311 that the current capturing range is not contained within the range corresponding to the mikire prevention frame and it is determined in step S312 that the current capturing range is not contained in the range corresponding to the mikire frame, step S308 is advanced to, and both the mikire frame and the mikire prevention frame are displayed together on the LV image. Such a case is a situation in which mikire is occurring and a subject (for example, a light stand 402) that actually should not appear is appearing in the video being captured. Because it is desirable that the capturing range be immediately narrowed to return the capturing range to within the range of the mikire frame, the camera operator is alerted with a warning by displaying the mikire frame 512. Note that the display may be such that the display forms such as the color, thickness, or type of line used for the mikire frame 512 and the mikire prevention frame 513 may be made be different to make them distinguishably recognizable from each other. This situation is as illustrated in FIG. 5E1, and at least a portion of the current capturing range 501 is in a range on the outside of the range 502 corresponding to the mikire frame. In such a case, the mikire frame 512 is displayed on the live view as illustrated in FIG. 5E2. The operator can notice that the capturing range has entered a non-desirable state by seeing the display of the mikire frame 512. Accordingly, to eliminate the mikire, it is possible to change the capturing range until the mikire frame 512 ceases to be displayed, and thereby image capturing in a state in which mikire occurs can be kept to the minimum. Note that configuration may be taken so as apply attribute information that indicates that the current frame of the moving image being recorded is in a mikire state if it is determined in step S312 that the current capturing range is outside of the mikire frame. If such attribute information is recorded, it is possible to easily generate a video creation without any video in a mikire state by collectively deleting, during editing, frames to which the attribute information indicating the mikire state has been added. Furthermore, configuration may be taken such that if it is determined in step S312 that the current capturing range is outside of the mikire frame, a command (mikire command) indicating the mikire state is notified (transmitted) to an external device by a communication unit (not shown graphically) for communicating with external devices. For example, in a case where image capturing is being performed by a plurality of cameras, a mikire command is notified to a control apparatus that switches between a plurality of videos. With such a configuration, the control apparatus can immediately switch from the captured video of a camera in which the mikire command was generated to the captured video of a camera in which no mikire command is being generated. With such a configuration, it is possible to prevent a video in which mikire occurs from being broadcast or recorded.

Note that the specific calculation method for calculating the position and size of the "mikire frame" and the "mikire prevention frame" based on the camera direction r1 and the zoom position z1 at that point in time and the previously described camera direction r0 and the zoom positions z0 and z2 in step S311 and step S312 may be performed as follows. For example, rectangles based on (r0, z0) and (r0, z2) are modeled within the three-dimensional virtual space, and rendering is performed from a viewpoint of a virtual camera equivalent to the camera direction r1 and the zoom position z1 at the time of calculation. The virtual camera here is made to be a virtual camera of a particular viewpoint in a three-dimensional graphics technique.

The camera microcomputer 114 ends the series of operations when a predetermined end condition such as a power off by the operator is satisfied in step S314.

Here, in the case where the angle of view when the "mikire frame" is set is wider than the angle of view during image capturing (when the focal length is shorter), the previously described rectangle based on z0 and r0 in the three-dimensional virtual space is outside of the field of view of the virtual camera corresponding to the camera direction r1 and the zoom position z1. Note that the angle of view when the "mikire frame" is set is the capturing range based on r0 and z0, and the angle of view during image capturing is the current capturing range based on r1 and z1. Also, it is assumed that a pan/tilt operation is not being performed at this time. In such a case, the "mikire frame" graphics data is not generated because the diagram is not rendered. In other words, the "mikire frame" is not displayed on the display unit 108.

On the other hand, in a case where the angle of view corresponding to the "mikire prevention frame" is narrower than the angle of view during operation (during calculation) (when the focal length is longer), the above-described rectangle based on r0 and z2 in the three-dimensional virtual space is inside of the field of view of the virtual camera corresponding to the camera direction r1 and the zoom position z1. Accordingly, the graphics data for the "mikire prevention frame" is generated, and the "mikire prevention frame" is displayed on the display unit 108.

Thus, when a zoom-out operation is performed by the operator on the digital camera 100 from a focal length that is longer than the zoom position z2, first the "mikire prevention frame" is displayed on the display unit 108, and when the zoom-out operation is continued, the "mikire frame" is displayed on the display unit 108. The "mikire frame" is a boundary that is an indication of "mikire", and by the display of the "mikire prevention frame", the operator can know that "mikire" will occur if a field of view change operation (the "zoom-out operation" in this case) is continued before "mikire" actually occurs.

Figure 4:
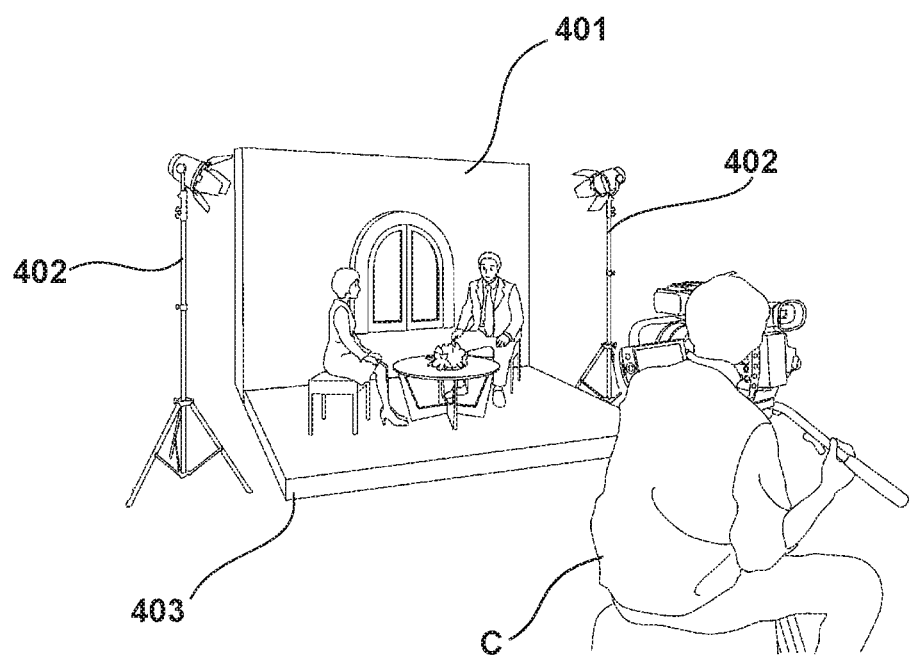
FIG. 4 is a view which illustrates a state in which a studio set is being captured by the digital camera 100 according to the present embodiment.

FIG. 4 is a view which illustrates a state in which a studio set is being captured by the digital camera according to an embodiment of the present invention. C denotes an operator (camera operator), 401 denotes the set, and 402 denotes a light stand. A case where the light stand 402 or the edge of the set (for example 403) appears in the video is a so-called "mikire".

FIGS. 5A1-5E2 are screen transition views which represent changes in which the display state of the display unit 108 transitions due to zoom operations by an operator. FIG. 5A1 and FIG. 5A2 illustrate a state in which image capture is being performed at an angle of view after adjustment by zoom-in/zoom-out operations by the operator to a capturing range in which the light stand 402 and the set edge 403 do not appear (adjustment to a range in which there is no "mikire"). FIG. 5A1 and FIG. 5A2 respectively are examples of the relationship between the subject and the capturing range 501 and the display on the display unit 108 at that time.

In the display of FIG. 5A2, a boundary that is an indication of "mikire" is set by an operation when the operator presses a button. When the mikire boundary is set, as illustrated in FIG. 5B1, a range that is the same as the capturing range 501 is set as the range 502 of the mikire frame, and the range 503 of the mikire prevention frame is set to a range that is even narrower than that. Then, as illustrated in FIG. 5B2, on the display unit 108, the mikire frame 512 is displayed at the frame of the LV image being captured, and the mikire prevention frame 513 is also displayed.

As described above, for the "mikire frame" and the "mikire prevention frame", graphics, into which model data of rectangles set virtually in the three-dimensional virtual space is rendered for the viewpoint of a virtual camera corresponding to the digital camera direction and zoom position, are superimposed on the captured video and the result is displayed. Accordingly, when the zoom position of the digital camera 100 is changed, the sizes at which the "mikire frame" and the "mikire prevention frame" are displayed are changed.

FIG. 5C1 is a view illustrating a relationship between the capturing range 501, the mikire frame range 502, and the mikire prevention frame range 503 at a time when zooming in is performed to a sufficiently long focal length (sufficiently narrow angle of view) by an operation by the operator from the state of FIG. 5B1. The capturing range 501 becomes a range that is narrower than the mikire prevention frame range 503. In such a case, the LV image is displayed as in FIG. 5C2 in the display unit 108, the mikire frame 512 and the mikire prevention frame 513 are not displayed. The sizes at which the "mikire frame" and the "mikire prevention frame" are to be displayed become larger due to the zoom position of the digital camera being changed to a position corresponding to a longer focal length (a narrower angle of view), and so they protrude out of the region that is shown on the screen.

When a zoom-out operation is performed by the operator from this state, as illustrated in FIG. 5D1, the capturing range 501 first becomes wider than the mikire prevention frame range 503. At this time, assume that the capturing range 501 is still narrower than the mikire frame range 502. In this state, first the mikire prevention frame 513 is displayed, as illustrated in FIG. 5D2. This is because the size at which the "mikire frame" and the "mikire prevention frame" are to be displayed became smaller, and first the "mikire prevention frame" fits into the region that is shown on the screen.

Upon zooming out further, as illustrated in FIG. 5B1, the capturing range 501 becomes the same range as the mikire frame range 502. In this state, the mikire frame 512 is displayed, as illustrated in FIG. 5B2. This is because the size at which the "mikire frame" and the "mikire prevention frame" are to be displayed becomes smaller, and following the "mikire prevention frame", the "mikire frame" comes to fit within the region that is shown on the screen.

When zooming out is further performed, as illustrated in FIG. 5E1, the capturing range 501 becomes a range that is wider than the mikire frame range 502, and even the light stand 402 is included in the capturing range 501. In this state, as illustrated in FIG. 5E2, the light stand 402 appears in the video, and there is a so-called "mikire".

FIGS. 6A-6D are screen transition views representing states in which the display of the display unit 108 changes in a case of a so-called panning operation in which the horizontal direction of a camera is changed by an operator.

Figure 6A:
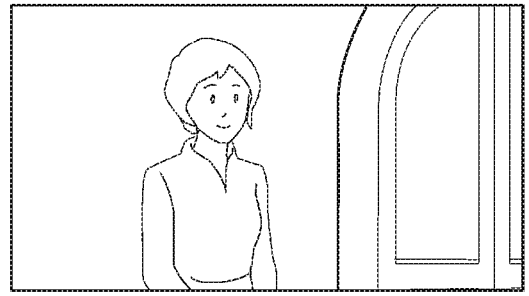
FIGS. 6A-6D are views for describing display states of the display unit 108 in a case of a so-called panning operation in which the horizontal direction of a camera is changed by an operator.
Figure 6B:
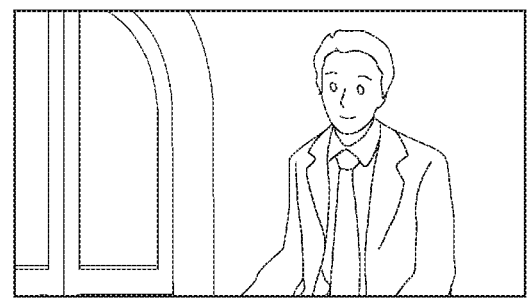

FIG. 6A illustrates a screen display in a case of capturing of the person on a left side when facing the studio set with a focal length that is longer (a state in which the angle of view is narrower) than a state in which the capturing range is the same range as the mikire frame range (in other words, FIG. 5A2). Also, FIG. 6B illustrates a screen display in a case where a panning operation is performed by the operator in the rightward direction from the state of FIG. 6A, and the person on the right side when facing the studio set is being captured. In the states of FIG. 6A and FIG. 6B, since the capturing range is a range that is narrower than the mikire prevention frame range 503, the mikire frame 512 and the mikire prevention frame 513 are not displayed.

Figure 6C:
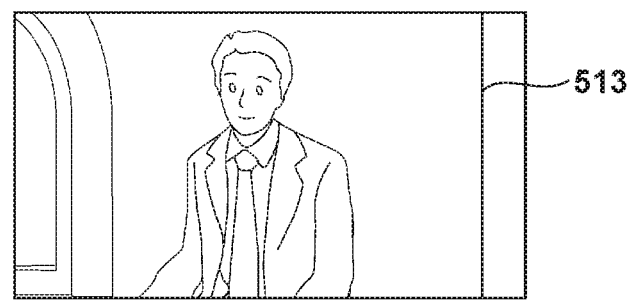

FIG. 6C illustrates a screen display in a case where a panning operation in the rightward direction is performed by the operator from the state of FIG. 6B. In FIG. 6C, a part of the mikire prevention frame 513 is displayed. This is because the capturing range due to the panning operation entered a state in which it includes the outside of the mikire prevention frame range 503 (and the inside of the mikire frame range 503).

Figure 6D:
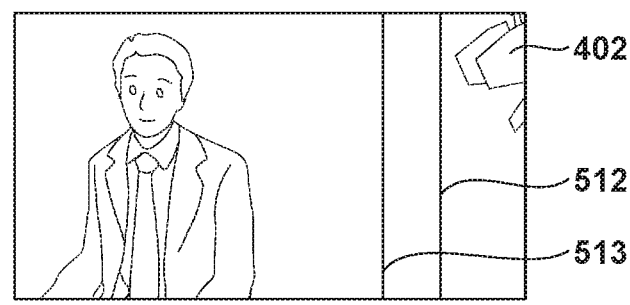

Upon further panning in the rightward direction, a part of the mikire frame 512 ends up being displayed in FIG. 6D. Here, the capturing range enters a state in which it includes the outside of the mikire frame range 502 due to the panning operation (the light stand 402 appears in the video) being further performed, resulting in a so-called "mikire".

As described above, the operator can search for an angle of view at which "mikire" will not occur by performing zooming operations while confirming the video being captured on the display unit 108, and can set the mikire frame 512 as a "boundary" which is an indication of "mikire" to that angle of view. The mikire prevention frame 513 is thereby set to notify to the operator that the boundary at which mikire will occur is close. It becomes possible for the operator to know that the boundary that is the indication of mikire is close by the "mikire prevention frame" being displayed on the display unit 108 prior to mikire occurring by performing the above-described field of view change operation.

Note that configuration may be taken so as to not display the mikire frame or the mikire prevention frame during recording standby (a state in which capturing is performed and the live view image is being displayed, but a moving image is not being recorded to a non-volatile recording medium). In other words, configuration may be taken so as to only perform the display of the mikire frame and the mikire prevention frame during recording of a moving image. With such a configuration, during adjustment of the capturing range during recording standby, it is possible to freely set the capturing range without being distracted by the mikire frame 512 and the mikire prevention frame 513, and it is possible to prevent mikire during recording.

In the present embodiment as described above, a boundary is set as a mikire frame in relation to video displayed on the display unit 108, and the mikire prevention frame is displayed when the capturing range of the displayed video becomes close to the mikire frame due to a field of view change operation by the camera operator. With such a configuration, it becomes possible for the operator (camera operator) to receive a notification in advance in cases where so-called "mikire" will occur when the operator changes the angle of view.

<Variation>

In a variation, an example in which predetermined graphics illustrated in FIGS. 7A-7D are displayed between the "mikire prevention frame" and the "mikire frame" is described. Field of view change operations performed in the example of FIGS. 7A-7D are operations in which the angle of view is changed from one that is close to the person on the left side when facing the studio set (a so-called "close-up") to one that includes the entire studio set (so-called "full-size"). In other words, operations that combine pan/tilt and zooming out are performed.

Figure 7A:
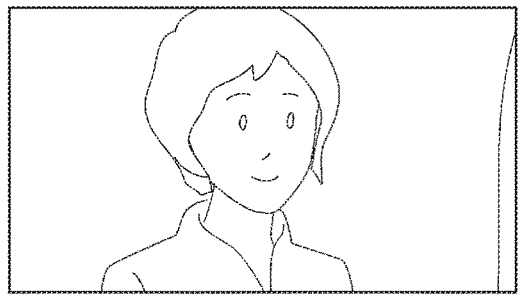
FIGS. 7A-7D are views which describe display states of the display unit 108 according to field of view change operations by an operator.
Figure 7B:
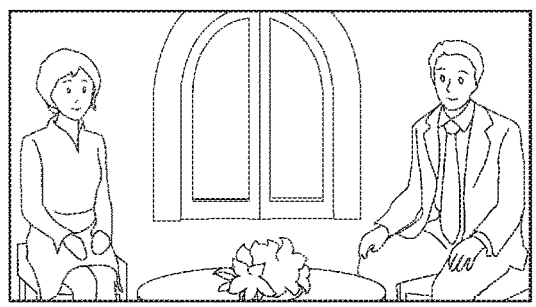

FIG. 7A is a screen display in a case where the person on the left side when facing the studio set is being captured in a "close-up". From the state in FIG. 7A, when a field of view change operation that combines a panning operation to the rightward direction and a zoom-out operation is performed by the operator, the screen display transitions to the screen display illustrated in FIG. 7B. In FIG. 7B, the person on the right side when facing the studio set has come to appear in the screen. In the state of FIG. 7A and FIG. 7B, since the capturing range is narrower than the mikire prevention frame range 503, the mikire frame 512 and the mikire prevention frame 513 are not displayed. When a field of view change operation that combines a panning operation to the rightward direction and a zoom-out operation is further performed by the operator, the screen display illustrated in FIG. 7C is transitioned into.

Figure 7C:
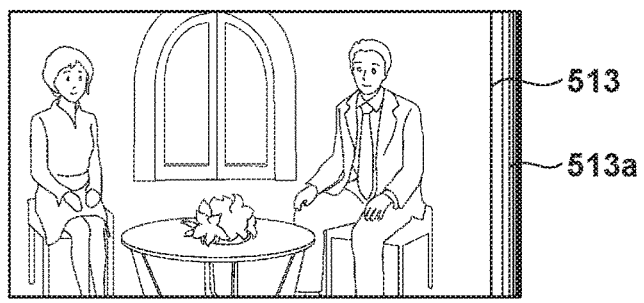

In FIG. 7C, a portion of the mikire prevention frame 513 and mikire prevention graphics 513a appear. This indicates that the capturing range entered a state in which it includes the outside of the mikire prevention frame range 503 (and the inside of the mikire frame range 503) due to the field of view change operation. In the mikire prevention graphics 513a, line segments displayed between the mikire frame 512, which is not illustrated in FIG. 7C, and the mikire prevention frame 513, and the intervals between adjacent lines become smaller the closer from the mikire prevention frame to the mikire frame they are. Note that the mikire prevention graphics 513a is displayed when the camera microcomputer 114 displays the mikire prevention frame in the foregoing step S313 and in step S308. The intervals of the mikire prevention graphics 513a may be adjusted based on a position relation between the mikire frame and the mikire prevention frame.

Figure 7D:
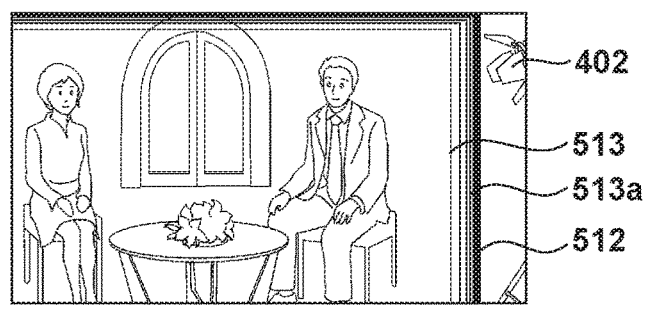

FIG. 7D is a screen display for a case in which a combination of panning operation to the rightward direction and a zoom-out operation are further performed by the operator from the state of FIG. 7C. In FIG. 7D, the capturing range enters a state in which it includes the outside of the mikire frame range 502 due to a field of view change operation (the light stand 402 appears in the video) being further performed, resulting in a so-called "mikire". For this reason, the mikire frame 512, which is a boundary that is an indication of mikire, the mikire prevention frame 513, which notifies the operator that the mikire frame 512 is close, and the mikire prevention graphics 513a are displayed.

In this way, by the display of the "mikire prevention frame" in FIG. 7C first, the operator can understand that mikire will occur if the field of view change operation is continued as is. Also, the closer to the mikire frame from the mikire prevention frame the line segments of the "mikire prevention graphics" are, the narrower the interval between adjacent line segments becomes, and therefore it becomes possible to intuitively understand how close the mikire frame is while performing a field of view change operation. Specifically, the operator can intuitively predict at what stage "mikire" will occur in accordance with the change in the mikire prevention graphics 513a intervals, and it becomes easier to take measures to prevent mikire. The transparency or color of the "mikire prevention graphics" may change the closer to the mikire frame from the mikire prevention frame they are. With such a configuration, it is possible to achieve a similar effect.

Note that, in the above described embodiment, a method for, when image capturing at an angle of view at which there ceases to be any "mikire", setting a peripheral edge of that angle of view as the "mikire frame" by an operation such as a button press by the operator was described (refer to reference numerals 502 and 503 in FIGS. 5A1-5E2). In this method, there is a problem in that the operator cannot set the "mikire frame" while confirming portions such as image capturing instruments and outside of the studio set at which "mikire" occurs on the display unit 108. Also, there a problem that the aspect ratio of the "mikire frame" (the so-called "length-to-breadth ratio") can only be set to be the same as the aspect ratio of the angle of view.

With respect to this, the display unit 108 is configured as a touch display on which the operator can perform touch operations, for example. Also, configuration may be taken so that the operator can set a rectangle as the "mikire frame" by drawing it in a touch operation on the display unit 108 so not to include portions in which image capturing instruments and the like are being displayed. Note that the contacted surface in such a touch-drawing operation on the panel using one's finger will have somewhat of a width, but configuration may be taken to extract consecutive pixels that configure the outline of subjects by comparing/analyzing the luminance and hue of pixels in the region that the operator's finger contacted, and to set a rectangle that does not intersect such outlines as the "mikire frame". In this way, in a case where it is possible to set the "the mikire frame by a touch operation on a touch display, the operator is enabled to set the "mikire frame" while confirming on the display unit 108 portions such as an image capturing instrument or outside of the studio set in which "mikire" will occur. Also, it becomes possible to set a "mikire frame" whose aspect ratio is different to the aspect ratio of the angle of view.

Also, in the foregoing processing, the camera microcomputer 114 sets the "mikire prevention frame" in accordance with the mikire frame. However, configuration may be taken to set the "mikire prevention frame" by the operator performing a touch-drawing operation. However, it is necessary that the "mikire prevention frame" be set inside of the "mikire frame". Accordingly, configuration may be taken such that the camera microcomputer 114 performs an error display on the display unit 108 in a case where the operator performs a touch-drawing operation outside of the "mikire frame", or to automatically changes the position so that it is inside of the "mikire frame".

Additionally, detailed description of recording (outputting metadata) attribute information that indicates that the current frame of the moving image being recorded is in a mikire state if it is determined in previously described step S312 that the current capturing range is outside of the mikire frame.

As described above, "mikire", in which a portion such as an image capturing instrument or outside of the studio set appears in the video, is one example of a case of failure in video capturing. Accordingly, it is convenient to be able to know whether or not "mikire" occurred prior to a video signal being outputted.

MP4 (official name: ISO/IEC 14496-14: 2003) which is a moving image compression format can include header information for each track, description of content details, and time information as metadata. Accordingly, it is possible to consider associating a compressed video signal and a meta description that "mikire" is occurring in a case where a "mikire frame" is being displayed on the display unit 108, and to output that in an MP4 format, for example. Of course, the format when outputting the video signal and the metadata may be other than MP4.

If it is outputted as metadata of the video signal of the video being captured that "mikire" is occurring, it is possible to know whether or not "mikire" occurred prior to the video signal being outputted. Thereby, it becomes easier to sort, depending on whether or not "mikire" occurred, capturing that succeeded (a so-called "good take") and capturing that failed (a so-called "bad take") when repeatedly capturing the same scene (so-called "takes"), for example.

Note that when captured video is being broadcast or recorded, a light arranged on the housing of the digital camera 100 (a so-called "tally light") is caused to light up in order to notify the operator, and the text "REC" or a predetermined icon may be displayed on the display unit 108. The operator is notified that the video is being broadcast or recorded in order to prevent that the operator does test-like angle of view change operation because the operator misunderstands that it is a rehearsal. In particular, when the video being captured is being broadcast or recorded, it is necessary for the operator to perform field of view change operations being all the more careful that "mikire" does not occur. Accordingly, in a case where the digital camera 100 determines that the video being captured is in a state of being broadcast or recorded, the display state of the "mikire prevention frame" or the "mikire prevention graphics" is made to be different to cases when it is not in such as state. Making the display state different can mean, for example, performing/not performing a blinking display, or making the color white or red. With such a configuration, it is possible to easily recognize cases in which the video that is being captured is being broadcast or recorded, and it becomes possible for the operator to perform a field of view change operation being more careful that "mikire" does not occur in a case of broadcasting or recording.

Note that the various control described above as being performed by the camera microcomputer 114 may be performed by one or more piece of hardware, and the overall control of an apparatus may be performed by assigning processing to a plurality of pieces of hardware.

In addition, although the present invention was explained in detail based on suitable embodiments, the present invention is not limited to these specific embodiments, and various forms of a scope that does not deviate from the gist of this invention are included in the invention. Furthermore, the above described embodiments of the present invention are merely examples and it is possible to combine embodiments as appropriate.

The foregoing embodiments were described using an example of a case in which the present invention is applied to a digital camera used in a studio, but limitation is not made to the studio set example, and application to any device that decides a target capturing range prior to image capturing and then captures within that capturing range is possible. In other words, the present invention can be applied to a personal computer, a PDA, a mobile telephone terminal, a game device, a tablet terminal, a smart phone, an in-vehicle device, a monitoring camera system, a medical device or the like that can detect an image capturing unit and a camera direction. Also, the present invention can be applied to apparatuses such as a smart phone, a tablet PC, or a desktop PC that receive captured live view images via wired or wireless communication, display the images, and control a digital camera (including a network camera) remotely.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-016973, filed Feb. 1, 2017, which is hereby incorporated by reference herein in its entirety.

What is claimed is:

1. An image capturing control apparatus, comprising:
at least one processor or circuit configured to perform the operations of following units:
a display control unit configured to perform control to display a video that an image capturing unit is capturing on a display unit;
a boundary setting unit configured to set a boundary in relation to the video that is displayed on the display unit;
a detection unit configured to detect a change of a capturing range in the image capturing unit;
a notification unit configured to, in a state in which the capturing range displayed on the display unit does not include the outer side of the boundary set by the boundary setting unit, and in a case where the boundary is close to the capturing range from the inner side of the boundary, perform a notification by a display that differs to a case where the boundary is not close; and
an output unit configured to, in a case where the capturing range displayed on the display unit includes the boundary set by the boundary setting unit, associate and output data indicating inclusion of mikire with a video signal of the video being captured by the image capturing unit.

2. The image capturing control apparatus according to claim 1,
wherein the notification by the notification unit is performed by displaying a graphic on the display unit.

3. The image capturing control apparatus according to claim 2,
wherein, among a first line indicating the boundary set by the boundary setting unit and a second line that is a boundary at which the notification by the notification unit is started and that indicates a boundary contained within the boundary set by the boundary setting unit, the graphic includes at least the second line.

4. The image capturing control apparatus according to claim 3,
wherein the graphic further includes one or more lines displayed between the first line and the second line, at least one of a transparency, a color, and an interval between adjacent lines of the one or more lines changes as the first line is approached from the second line.

5. The image capturing control apparatus according to claim 1,
wherein the display unit includes a touch display, and
wherein the boundary setting unit sets the boundary according to a touch operation by an operator on the touch display.

6. The image capturing control apparatus according to claim 5,
wherein the boundary setting unit is configured to set a boundary at which the notification by the notification unit is started according to a touch operation by the operator on the touch display.

7. The image capturing control apparatus according to claim 1, further comprising a determination unit configured to determine whether the video being captured is in a state of being broadcast or recorded,
wherein the notification unit causes a display state of the notification by the notification unit to be different in a case where it is determined that the video being captured is in a state of being broadcast or recorded by the determination unit to a case where it is determined to not be in the state.

8. The image capturing control apparatus according to claim 1, further comprising a decision unit configured to decide a boundary at which to start the notification by the notification unit based on the boundary set by the boundary setting unit.

9. The image capturing control apparatus according to claim 8,
wherein the decision unit decides the boundary at which to start the notification by the notification unit in accordance with the boundary set by the boundary setting unit being set.

10. The image capturing control apparatus according to claim 8,
wherein the notification unit, in a case where the capturing range displayed on the display unit includes the boundary at which to start the notification by the notification unit, performs the notification by performing the display that differs.

11. The image capturing control apparatus according to claim 1,
wherein the detection unit detects a change of the capturing range in a case where the capturing range becomes wider based on a zoom-out operation by an operator.

12. The image capturing control apparatus according to claim 1,
wherein the detection unit detects a change of the capturing range based on a detection result of an imaging direction sensor that detects a capturing direction in the image capturing unit based on at least one of an acceleration measurement, a geomagnetism measurement, and a gyro measurement.

13. A method of controlling an image capturing control apparatus, the method comprising:
performing a display control to display, on a display, a video that an image capturing unit is capturing;
setting a boundary in relation to the video that is displayed on the display;
detecting a change of a capturing range in the image capturing unit; and
in a state in which the capturing range displayed on the display does not include the outer side of the boundary, and in a case where the boundary is close to the capturing range from the inner side of the boundary, performing a notification by displaying differently to a case where the boundary is not close,
in a case where the capturing range displayed on the display includes the boundary set in the setting, associating and outputting data indicating inclusion of mikire with a video signal of the video being captured by the image capturing unit.

14. A non-transitory computer-readable storage medium storing a program for causing a computer to execute a method of controlling an image capturing control apparatus, the method comprising:
performing a display control to display, on a display, a video that an image capturing unit is capturing;
setting a boundary in relation to the video that is displayed on the display;
detecting a change of a capturing range in the image capturing unit; and
in a state in which the capturing range displayed on the display does not include the outer side of the boundary, and in a case where the boundary is close to the capturing range from the inner side of the boundary, performing a notification by displaying differently to a case where the boundary is not close,
in a case where the capturing range displayed on the display includes the boundary set in the setting, associating and outputting data indicating inclusion of mikire with a video signal of the video being captured by the image capturing unit.

15. An image capturing control apparatus, comprising:
at least one processor or circuit configured to perform the operations of following units:
a display control unit configured to perform control to display a video that an image capturing unit is capturing on a display unit;
a boundary setting unit configured to set a boundary in relation to the video that is displayed on the display unit;
a detection unit configured to detect a change of a capturing range in the image capturing unit; and
a notification unit configured to, in a state in which the capturing range displayed on the display unit does not include the outer side of the boundary set by the boundary setting unit, and in a case where the boundary is close to the capturing range from the inner side of the boundary, perform a notification by a display that differs to a case where the boundary is not close,
wherein the notification by the notification unit is performed by displaying a graphic on the display unit,
wherein, among a first line indicating the boundary set by the boundary setting unit and a second line that is a boundary at which the notification by the notification unit is started and that indicates a boundary contained within the boundary set by the boundary setting unit, the graphic includes at least the second line,
wherein the graphic further includes one or more lines displayed between the first line and the second line, at least one of a transparency, a color, and an interval between adjacent lines of the one or more lines changes as the first line is approached from the second line.

16. A method of controlling an image capturing control apparatus, the method comprising:
performing a display control to display, on a display, a video that an image capturing unit is capturing;
setting a boundary in relation to the video that is displayed on the display;
detecting a change of a capturing range in the image capturing unit; and
in a state in which the capturing range displayed on the display does not include the outer side of the boundary, and in a case where the boundary is close to the capturing range from the inner side of the boundary, performing a notification by displaying differently to a case where the boundary is not close,
wherein the notification is performed by displaying a graphic on the display,
wherein, among a first line indicating the boundary set in the setting and a second line that is a boundary at which the notification is started and that indicates a boundary contained within the boundary set in the setting, the graphic includes at least the second line,
  wherein the graphic further includes one or more lines displayed between the first line and the second line, at least one of a transparency, a color, and an interval between adjacent lines of the one or more lines changes as the first line is approached from the second line.

17. A non-transitory computer-readable storage medium storing a program for causing a computer to execute a method of controlling an image capturing control apparatus, the method comprising:
  performing a display control to display, on a display, a video that an image capturing unit is capturing;
  setting a boundary in relation to the video that is displayed on the display;
  detecting a change of a capturing range in the image capturing unit; and
  in a state in which the capturing range displayed on the display does not include the outer side of the boundary, and in a case where the boundary is close to the capturing range from the inner side of the boundary, performing a notification by displaying differently to a case where the boundary is not close,
  wherein the notification is performed by displaying a graphic on the display,
  wherein, among a first line indicating the boundary set in the setting and a second line that is a boundary at which the notification is started and that indicates a boundary contained within the boundary set in the setting, the graphic includes at least the second line,
  wherein the graphic further includes one or more lines displayed between the first line and the second line, at least one of a transparency, a color, and an interval between adjacent lines of the one or more lines changes as the first line is approached from the second line.

\* \* \* \* \*